(12) United States Patent
Taniguchi et al.

(10) Patent No.: US 7,065,227 B2
(45) Date of Patent: Jun. 20, 2006

(54) DATA PROCESSING APPARATUS, IMAGE PROCESSING APPARATUS, AND METHOD THEREFOR

(75) Inventors: Masaaki Taniguchi, Yamato (JP); Shuhichi Shimuzu, Plainsboro, NJ (US); Kohichi Kamijoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 09/834,365

(22) Filed: Apr. 13, 2001

(65) Prior Publication Data

US 2002/0001394 A1    Jan. 3, 2002

(30) Foreign Application Priority Data

Apr. 13, 2000 (JP) ............................. 2000-111674

(51) Int. Cl.
*G06K 9/00* (2006.01)
(52) U.S. Cl. ..................................................... 382/100
(58) Field of Classification Search ................. 382/100
See application file for complete search history.

(56) References Cited

U.S. PATENT DOCUMENTS

| | | | | |
|---|---|---|---|---|
| 6,141,753 A * | 10/2000 | Zhao et al. | ................. | 713/176 |
| 6,222,932 B1 | 4/2001 | Rao et al. | | |
| 6,415,041 B1 * | 7/2002 | Oami et al. | ................. | 382/100 |
| 6,442,284 B1 * | 8/2002 | Gustafson et al. | .......... | 382/100 |
| 6,633,653 B1 * | 10/2003 | Hobson et al. | ............ | 382/100 |
| 6,697,499 B1 * | 2/2004 | Oami | ........................ | 382/100 |
| 6,704,431 B1 * | 3/2004 | Ogawa et al. | .............. | 382/100 |
| 6,707,927 B1 * | 3/2004 | Kita et al. | .................. | 382/100 |
| 6,718,045 B1 * | 4/2004 | Donescu et al. | ............ | 382/100 |

FOREIGN PATENT DOCUMENTS

| | | |
|---|---|---|
| EP | 0859337 A2 | 8/1998 |
| EP | 1041815 A2 * | 4/2000 |
| JP | 11-346302 | 12/1999 |

OTHER PUBLICATIONS

WPI Abstract Accession No. 2000-537873 & JP 2000209428 NEC (Jul. 28, 2000).

* cited by examiner

*Primary Examiner*—Joseph Mancuso
*Assistant Examiner*—Shefali Patel
(74) *Attorney, Agent, or Firm*—Scully, Scott, Murphy & Presser; Louis P. Herzberg

(57) ABSTRACT

Watermark data that indicate additional information, such as copyright information, are optimized in accordance with the contents of object data, and the watermark data is embedded in image data. An image divider 200 divides image data Vi into image blocks Iij, and corresponds a selected basic pattern Phij with each of the image blocks Iij. Orthogonal transformation units 24 and 202 generate DFT coefficients I'ij and P'hij, and power element calculators 208 and 264 generate power elements I"ij and P"ij. A basic pattern adjustment unit 26 adjusts the coefficient of P'hij to generate P'hij1 to P'hijn. A watermark pattern generator 28 calculates variations before and after P'hij1 to P'hijn are embedded in I"ij, and selects, from P'hij1 to P'hijn, P'''hij1 to P'''hij1 that provide variations equal to or smaller than the threshold value e. Then, the watermark pattern generator 28 selects, as a watermark pattern P'ij, the pattern that is most easily detectable, and a pattern embedding unit 204 that adds P'ij to I'ij.

26 Claims, 9 Drawing Sheets

Tij(P1'Pm,C1'Cn)

DATA PROCESSING APPARATUS, IMAGE PROCESSING APPARATUS, AND METHOD THEREFOR

BACKGROUND OF THE INVENTION

1. Technical Field

The present invention relates to a data processing apparatus, an image processing apparatus and a method therefor, for embedding additional information, such as copyright information, in object data, such as image data or audio data. More particularly, the present invention is directed to a data processing apparatus, an image processing apparatus and a method therefor, for appropriately selecting from a plurality of candidate data sets, in accordance with object data contents, optimal watermark data that while ordinarily indiscernible can be easily detected, and for embedding the watermark data in the object data.

2. Prior Art

In International Publication No. WO 97/49235, for example, a system is disclosed for employing pixel block coding (PBC) to embed copyright information (also generally referred to, hereinafter, as verification data) in object data, such as image data, so that it is not visually discernible (the system for embedding verification data in content data so that it is not visually discernible is also, hereinafter, called an "electronic watermarking system).

In International Publication No. WO 98/116928 a method is disclosed for employing the electronic watermarking system disclosed in document 1 to inhibit the alteration of image data and to effectively protect literary materials.

In Japanese Unexamined Patent Publication No. Hei 10-164549, an improvement, to the electronic watermarking method in document 1, is disclosed for verifying indivisible embedded watermark data in order to detect the alteration of image data. In addition to these documents, an invention concerning the electronic watermarking system is disclosed in Japanese Unexamined Patent Publications Nos. Hei 09-151747, Hei 10-83310, Hei 10-106149, Hei 10-161933, Hei 10-164349, Hei 10-285562, Hei 10-334272, Hei 10-240626 and Hei 10-240129, and U.S. Pat. No. 5,315,448 (Japanese Patent No. Hei 8-507912), U.S. Pat. No. 5,745,604, U.S. Pat. No. 5,768,426, U.S. Pat. No. 5,850,481 and U.S. Pat. No. 5,832,119.

However, excluding one part of these documents, a method is not disclosed for optimizing watermark data in accordance with the contents of object data, e.g., the quality of the images provided by image data, and for embedding the optimized watermark data.

Further, while one part of these documents carries a description concerning a method, in accordance with the contents of an image, for changing watermark data that is to be embedded, the methods disclosed in the documents are less compatible with the properties of the data that are to be embedded, and thus, the watermark data can not be satisfactorily optimized.

To resolve the conventional problem, it is highly desirable to provide a data processing apparatus, and a method therefor, for optimizing watermark data that indicate the presence of additional information, such as copyright information, in accordance with the contents of object data, and for embedding the optimized watermark data.

It is further highly desirable to provide an image processing apparatus, and a method therefor, for optimizing watermark data in accordance with the quality of image data, such as the property of an object, so that watermark data that is less noticeable but is easily detectable can be employed to perform embedding.

SUMMARY OF THE INVENTION

To achieve the above objects, the present invention is directed to a data processing apparatus selecting one of a plurality of candidate data corresponding to watermark data embedded into object data to embed the selected candidate data as the watermark data, comprises: a variation indication data generation means for generating a plurality of variation indication data indicating variation between the object data and each of the object data obtained by embedding each of the plurality of the candidate data; a detectability indication data generation means for generating a plurality of detectability indication data each indicating how easily each of the plurality of candidate data being detected; a watermark data selection means for selecting one of the candidate data based on the plurality of variation indication data and the plurality of detectability indication data; and a data embedding means for embedding the selected candidate data into the object data as the watermark data.

The present invention is further directed to an image processing apparatus selecting one of a plurality of candidate data corresponding to watermark data embedded into object image data to embed the selected candidate data into the object image data as the watermark data, comprising: a variation indication data generation means for generating a plurality of variation indication data indicating variation between the image data and each of the image data obtained by embedding each of the plurality of the candidate data; a detectability indication data generation means for generating detectability indication data each indicating how easily each of zero or more candidate data being detected; a candidate data selection means, for employing the detectability indication data to select one of the candidate data that corresponds to variation indication data for variations that are smaller than a predetermined reference; and a data embedding means for embedding the selected candidate data as the watermark data in the image data.

Preferably, the detectability indication data generation means generates detectability indication data indicating the detectability of the candidate data corresponding to the variation indication data indicating variations smaller than the predetermined reference.

Also, when no candidate data corresponding to the variation indication data for variations smaller than the predetermined reference exists, preferably, the candidate data selection means selects predetermined supplement data, instead of the candidate data.

In addition, each of the object image data is each of a plurality of image blocks obtained by dividing one image data set, and each of the watermark data corresponding to each of the object image data is each of one or more types of constituent data constituting additional information that is added to the object image data. The image processing apparatus further comprises: a watermark data correspondence means for corresponding the constituent data constituting the additional information data with the plurality of image blocks, as the watermark data; and a candidate data generation means for generating the plurality of candidate data corresponding to the constituent data corresponded with the plurality of image block.

Preferably, the watermark data correspondence means accepts predetermined key data to correspond the constituent data of the additional information data with the plurality of image blocks based on the predetermined key data.

Preferably, the candidate data generation means generates, as the plurality of candidate data, a plurality of additional patterns employing the same configuration as the object image data to be added to the object image data.

Also, the candidate data generation means preferably generates the plurality of additional patterns by multiplying a plurality of predetermined coefficients with basic patterns corresponding to the constituent data corresponded with the image blocks.

In addition, the detectability indication data generation means preferably calculates the detectability indication data representing a correlation between the additional patterns and the basic patterns. The candidate data selection means selects, from among the additional patterns, a pattern corresponding to detectability indication data representing the highest correlation. The image processing apparatus further comprises: a watermark data detection means for detecting the watermark data embedded into the image block, based on the correlation of the basic patterns and an image block into which the selected additional pattern embedded.

Preferably, the watermark data correspondence means sorts the plurality of image blocks into one or more of groups, each of which including one or more of the image blocks to correspond the constituent data with the image blocks that are included in the groups.

Also, the variation indication data generation means preferably calculates each of differences between each of entropy values for the object image data and each of entropy values for the object image data obtained by embedding each of the plurality of candidate data as the variation indication data.

In addition, the detectability indication data generation means preferably generates the detectability indication data for the respective candidate data corresponding to the variation indication data with their values within a predetermined range.

The present invention is still further directed to a data processing method, for selecting one of a plurality of candidate data corresponding to watermark data embedded into object data for embedding the selected candidate data as the watermark data, comprising: a variation indication data generation step of generating a plurality of variation indication data indicating variation between the object data and each of the object data obtained by embedding each of the plurality of the candidate data; a detectability indication data generation step of generating a plurality of detectability indication data each indicating how easily each of the plurality of candidate data being detected; a watermark data selection step of selecting one of the candidate data based on the plurality of variation indication data and the plurality of detectability indication data; and a data embedding step of embedding the selected candidate data into the object data as the watermark data.

Even further, the present invention is directed to an image processing method, for selecting one of a plurality of candidate data corresponding to watermark data embedded into object image data for embedding the selected candidate data into the object image data as the watermark data, comprising: a variation indication data generation step of generating a plurality of variation indication data indicating variation between the image data and each of the image data obtained by embedding each of the plurality of the candidate data; a detectability indication data generation step of generating detectability indication data each indicating how easily each of zero or more candidate data being detected; a candidate data selection step of employing the detectability indication data to select one of the candidate data that corresponds to variation indication data for variations that are smaller than a predetermined reference; and a data embedding step of embedding the selected candidate data as the watermark data in the image data.

Still even further, the present invention provides a first storage medium on which a computer-readable program selecting one of a plurality of candidate data corresponding to watermark data embedded into object data to embed the selected candidate data as the watermark data, the computer-readable program permitting a computer to perform: a variation indication data generation step of generating a plurality of variation indication data indicating variation between the object data and each of the object data obtained by embedding each of the plurality of the candidate data; a detectability indication data generation step of generating a plurality of detectability indication data each indicating how easily each of the plurality of candidate data being detected; a watermark data selection step of selecting one of the candidate data based on the plurality of variation indication data and the plurality of detectability indication data; and a data embedding step of embedding the selected candidate data into the object data as the watermark data.

The present invention further provides, a second storage medium on which a computer-readable program selecting one of a plurality of candidate data corresponding to watermark data embedded into object image data to embed the selected candidate data into the object image data as the watermark data, the computer-readable program permitting a computer to perform: a variation indication data generation step of generating a plurality of variation indication data indicating variation between the image data and each of the image data obtained by embedding each of the plurality of the candidate data; a detectability indication data generation step of generating detectability indication data each indicating how easily each of zero or more candidate data being detected; a candidate data selection step of employing the detectability indication data to select one of the candidate data that corresponds to variation indication data for variations that are smaller than a predetermined reference; and a data embedding step of embedding the selected candidate data as the watermark data in the image data.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
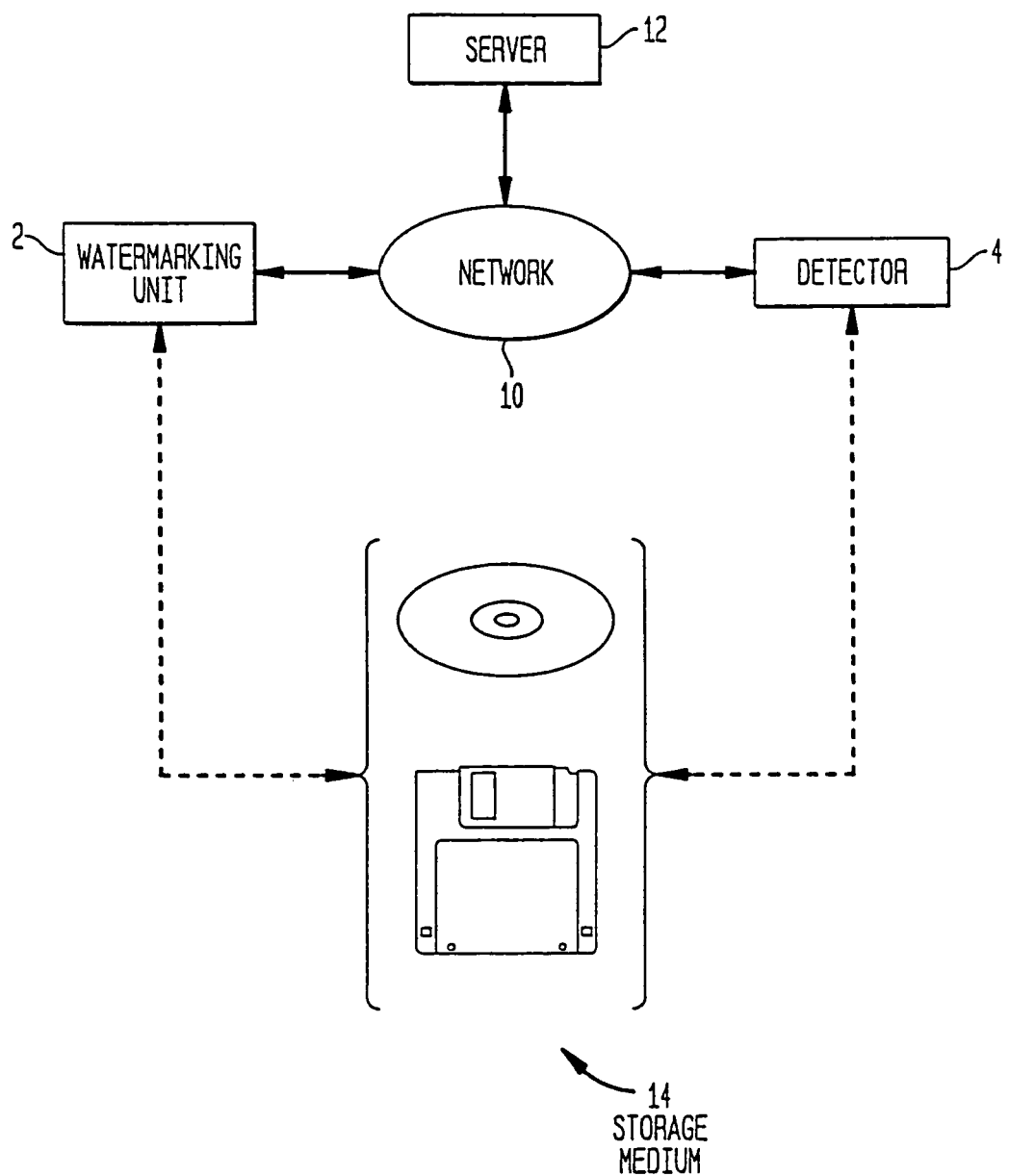
FIG. 1 is a diagram showing the arrangement of an image processing system that carries out an image processing method according to the present invention.

An image processing apparatus according to the present invention (also referred to, hereinafter, as this image processing apparatus) is the data processing apparatus for this invention, and is especially employed for the process for embedding watermark data in image data. To aid in the understanding of the invention, the image processing apparatus will be described by using specific examples wherein, to the extent possible, the same reference numerals are used as are employed in the preferred embodiment. The technical scope of the invention, however, is not limited to the specific examples.

This image processing apparatus divides input image data Vin, consisting of H pixels and W pixels, into a plurality of image blocks Iij, each composed of wb×hb (e.g., 8×8) pixels, and employs these blocks as object data for the performance of the embedding process (the object data are referred to, hereinafter, as image blocks Iij).

Furthermore, based on key data Key, which has an arbitrary data length, the image processing apparatus sorts the obtained image blocks Iij into groups S1 to Sg, which correspond respectively to g bits w1 to wg, constituting watermark data W having an arbitrary data length that represents additional information, such as copyright information.

Preferably, the image blocks Iij that are included in these groups Sh ($1 \leq h \leq g$) are evenly distributed throughout the image data Vin, and do not overlap the other image blocks Iij that are included in the other group Sx ($h \neq x$), while the same number of image blocks Iij as are included in the other group Sx, which belongs to the groups Sh.

The image processing apparatus employs the key data Key to correspond individual bits wh, of the watermark data W representing such additional information as copyright information, with two basic patterns Pha and Phb of m ($m \geq 2$) types of basic patterns P1 to Pm that have the same structure as the image blocks Iij but have different contents.

The two basic patterns Pha and Phb (Pha≠Phb) correspond to the values (1, 0) of the bits wh of the watermark data W, and in accordance with the value of the bit wh, one of the basic patterns Pha and Phb is corresponded with the individual bits wh of the watermark data W (see the preferred embodiment for the detailed correspondence).

Further, the basic patterns Pha and Phb that are corresponded with the bits wh may or may not overlap patterns Pxa and Pxb, which are corresponded with the other bits wx; however, generally, it is preferable that the basic patterns Pha and Phb be selected so that they do not overlap the others.

The image block Iij, which is corresponded with one of the bits wh, may or may not overlap an image block Iij', which is corresponded with another bit wh'.

This image processing apparatus corresponds the bits wh, of the watermark data W, with which the basic patterns Ph are corresponded, with the groups Sh obtained above.

As a result, based on the key data Key, the same pattern Phij (the selected basic pattern) and the bits wh of the watermark data W are corresponded for all the image blocks Iij included in the group Sh, and corresponded with each image block Iij, are one bit Wh and one type of basic pattern (the selected basic pattern in this embodiment) Phij.

Next, the image processing apparatus of this invention performs a predetermined process, e.g., an orthogonal transformation (DFT is hereinafter used as an example), for the image blocks Iij, and generates DFT transformation coefficients I'ij (also referred to, hereinafter, simply as image blocks I'ij) for the image blocks Iij.

Furthermore, the image processing apparatus adds the square of the real number and the square of the imaginary number of each element in each image block I'ij, and obtain a square root I"ij (referred to, hereinafter, as a power element I"ij or an image block I"ij).

In the following explanation, the DFT is employed as the transformation; however, as a modification, another transformation method, such as a DCT (discrete cosine transformation) or a wavelet transformation, may be employed.

The image processing apparatus multiplies each of the DFT coefficients P'hij (also referred to, hereinafter, as basic patterns P'ij) of the basic patterns Phij by, for example, the identical elements of n types of coefficients (adjustment coefficients) C1 to Cn, which have the same structure as the image blocks Iij and each element of which has a value of 0 to 1. Thus, n types of candidate data (adjustment basic patterns in this embodiment) P'hij1 to P'hijn are obtained. The image processing apparatus performs the same process as is performed for the image blocks I'ij for the n types of candidate data P'hij1 to P'hijn, and obtains the power elements P"hij1 to P"hijn (also referred to, hereinafter, as candidate data sets P"hij1 to P"hijn).

The image processing apparatus of this invention calculates the entropy for [e(I"ij+P"hij1) to e(I"ij+P"hijn)] for values (I"ij+P"hij1) to (I"ij+P"hijn) obtained by adding the image blocks I"ij and candidate data P"hij1 to P"hijn. Then, the image processing apparatus calculates the absolute values of the differences between the calculated entropy values and the entropy e(I"ij) for the image blocks I"ij, and regards them as variation indication data sets (comparison result data sets) R1 to Rn.

The image processing apparatus employs as a reference a predetermined threshold value e, extracted from the candidate data sets P'hij1 to P'hijn, and selects candidate data sets P'''hij1 to P'''hijn, which correspond to variation indication data sets R1 to Rl that hold a value equal to or smaller than the threshold value e (it should be noted that $0 \leq l \leq n$; and when l=0, there is no variation indication data equal to or smaller than the threshold value e).

The variation indication data are not necessarily calculated using the power elements of the DFT coefficients, and may be calculated using other elements, such as real number elements of the DFT coefficients. Furthermore, entropy need not always be used to calculate the variation values (of indiscernibility) when the candidate data are embedded in an image block, and another appropriate calculation method may be employed.

As is described above, the correspondence of the image blocks Iij and the basic patterns Phij is uniquely determined by the key data Key, the sum (referred to, hereinafter, as an inner product) is acquired for the products obtained by multiplying the individual elements of each image block Iij, in which the watermark data are embedded, and the individual elements of each basic pattern Phij, and the correlation of these inner products is examined to detect the watermark data. Therefore, to embed watermark data by adding one of the candidate data sets P'''hij1 to P'''hijn to the DFT coefficients I'ij of the image blocks Iij, one of the candidate data sets P'''hij1 to P'''hijn that is most nearly correlated with the basic pattern P'hij should be employed to easily detect the watermark data.

The image processing apparatus calculates the inner products (detection capability data in this embodiment) D1 to Dn for the basic pattern P'hij and the candidate data sets P'''hij1 to P'''hijn, and selects the candidate data set corresponding to the largest inner product as the final candidate data set (an embedding pattern in this embodiment) P'ij for the image block Iij.

Further, the image processing apparatus embeds the watermark data by adding identical elements in the image block I'ij and in the selected final candidate data P'ij, and generates the resultant image data Vw.

In this example, the correlation between the basic pattern and the candidate data is employed as the scale for detectability. When another detection method is employed, only the method used to determine the detectability of the candidate data must be changed in accordance with the pertinent detection method.

When there are no candidate data that provide variation indication data that are equal to or smaller, for example, than the predetermined threshold value e, a random pattern (supplemental pattern) Ps, which is prepared in advance, is selected as the final candidate data P'ij and is added to the image block I'ij, and the resultant data are embedded.

The processing for handling the image data has been employed as an example; however, it is apparent that the image processing apparatus of this invention can be appropriately modified for the processing for other data.

An explanation will now be given, while referring to the above described example, for the relationship of the individual components of the image processing apparatus of the invention and the components shown in the preferred embodiment, and the operation of the individual components.

The watermark data correspondence means corresponds to an image divider 200 and a basic pattern processor 22 in the preferred embodiment.

The watermark data correspondence means accepts the key data Key that are used for embedding and detecting watermark data W, and the watermark data W that represent additional information, such as copyright information. Based on the key data Key and the watermark data W, the watermark data correspondence means uniquely corresponds, with each of the image blocks Iij, one of the bits wh that constitute the watermark data W and the basic pattern (selected basic pattern) Phaij or Phbij, which corresponds to the bit wh and which has a bit value of 0 or 1.

The candidate data generation means corresponds to a basic pattern adjustment unit 26 in the preferred embodiment. The candidate data generation means multiplies the elements of the basic pattern P'hij, which the watermark data correspondence means corresponded with the image block Iij, by the identical elements of a plurality of coefficients (adjustment coefficients) C1 to Cn, and generates a plurality of candidate sets (adjustment basic patterns) P'hij1 to P'hijn.

In the image processing apparatus of the invention, the variation indication data generation means corresponds to entropy calculators 280 and 284, and an adder 282 and a comparator 286 in accordance with the preferred embodiment. For the variation indication data, the entropy of the image block I''ij and the entropy of the values obtained by adding the image block I''ij and each of the candidate data sets P''hij1 to P''hijn are calculated. The absolute values of the differences provided by entropy are obtained for each of the variation indication data sets (comparison data sets) R1 to Rn that represent the variations due to the embedding of the candidate data.

As the entropy variations become smaller, accordingly the variations in the image block due to the embedding of the candidate data are also reduced. And when the values of the variation indication data are small, the candidate data are indiscernible when they are embedded in an image block.

The detectability indication data generation means corresponds to a detectability calculator 292 in the preferred embodiment. The detectability indication data generation means calculates the accumulated addition values (referred to, hereinafter, as inner products) obtained by multiplying the elements of the basic pattern P'hij, which is corresponded with the image block Iij, and the identical elements of the candidate data sets P'''hij1 to P'''hijn, which provide the variation indication data having values equal to or smaller than the predetermined threshold value e. These inner products are regarded as detectability indication data sets D1 to Dn.

As is described above, the watermark data that is embedded in the individual image blocks is detected by obtaining the correlation of the image block Iij and each of the basic patterns Pha and Phb, which correspond to the watermark data wh assigned for the individual image blocks.

Therefore, it is found that of the candidate data sets P'''hij1 to P'''hijn, the candidate data that provides the basic pattern P'hij having the maximum inner product can be detected most easily.

The watermark data selection means corresponds to selectors 290 and 296 in the preferred embodiment. The watermark data selection means compares the variation indication data sets R1 to Rn with the threshold value e, and selects the candidate data that correspond to indication data that are equal to or smaller than the threshold value.

The detectability indication data generation means calculates the detectability indication data sets D1 to Dn for the individual candidate data sets P'''hij1 to P'''hijn selected by the watermark data selection means.

Further, as the final candidate data (watermark pattern) P'ij for the image block Iij, the watermark data selection means selects one of the candidate data sets P'''hij1 to P'''hijn that corresponds to the maximum detectability indication data.

When in this manner the watermark data selection means selects the candidate data at two stages, the calculations required of the detectability indication data generation means can be reduced.

When the calculations need not be taken into account, both the variation indication data generation means and the detectability indication data generation means can calculate the variation indication data and the detectability indication data for all the candidate data sets P'hij1 to P'hijn, and the watermark data selection means can simultaneously employ these two data sets to select the candidate data P'ij.

The data embedding means corresponds to a pattern embedding unit 204 in the preferred embodiment.

The data embedding unit embeds the selected final candidate data (watermark pattern) P'ij in the image block Iij by adding the coefficient of the final candidate data P'ij to the identical coefficient of the image block I'ij.

The data detection means corresponds to a watermark data detection program 40 in the preferred embodiment.

Based on the key data Key, for example, the data detection means corresponds the image blocks I'ij+P'ij with the basic patterns Phaij and Phbij, which respectively correspond to the bit values 0 and 1.

Further, the data detection means obtains the correlations between the image block Iij and the basic patterns Phaij and Phbij, and employs the correlations to detect the individual bits of the watermark data W.

FIG. 1 is a diagram showing the configuration of an image processing system 1 that carries out an image processing method according to the present invention.

Figure 2:
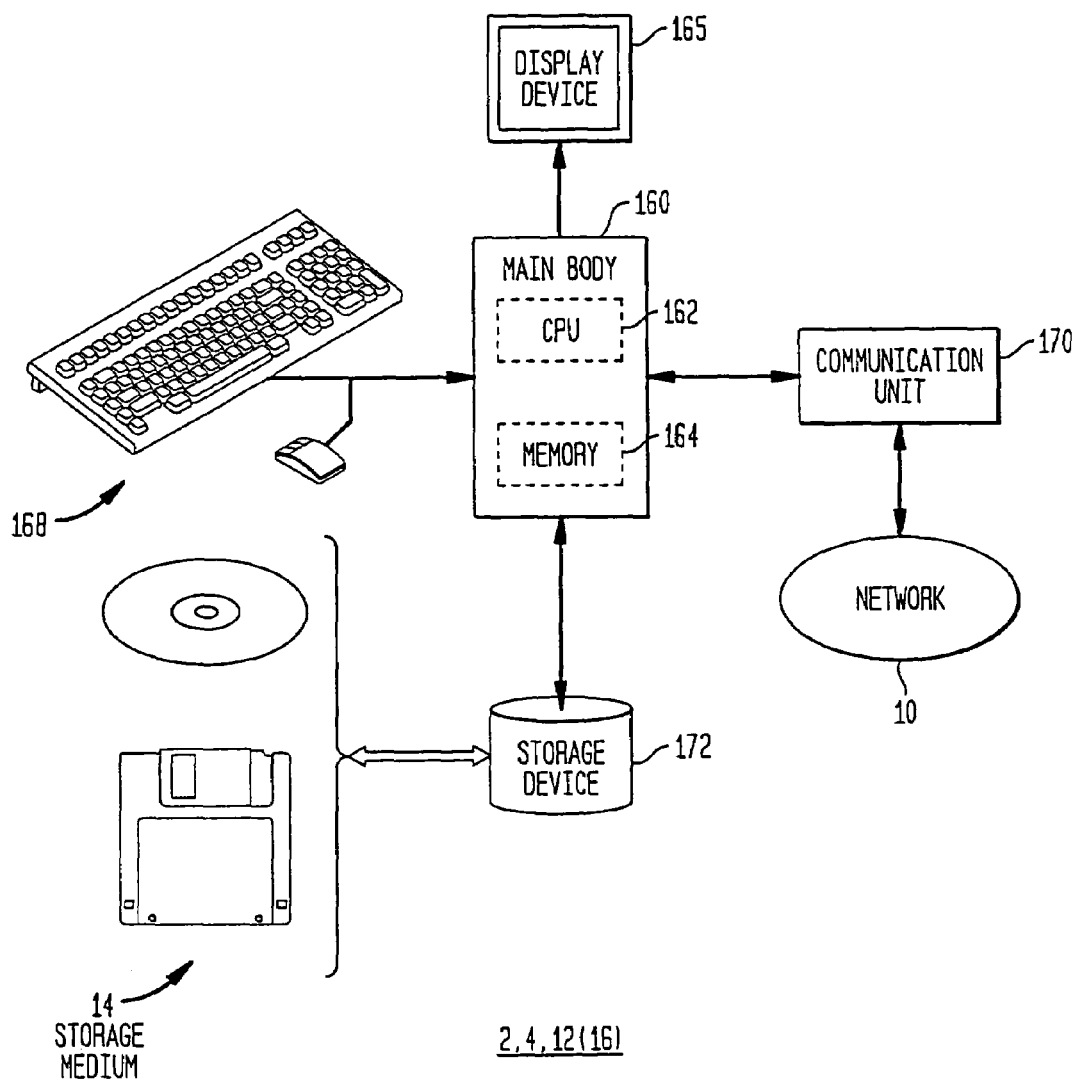
FIG. 2 is a diagram showing the hardware arrangement (a computer) for a watermarking unit, a detector and a server in FIG. 1.

FIG. 2 is a diagram showing the hardware arrangement used for a watermarking unit 2, a detector 4 and a server 12 in FIG. 1.

As is shown in FIG. 1, the image processing system 1 is so designed that the watermarking unit 2, the server 12 and the detector 4 are connected via a data transmission network, such as an ISDN network, a telephone communication network, or via a data communication network 10 such as a LAN.

As is shown in FIG. 2, the watermarking unit 2, the server 12 and the detector 4 in FIG. 1 are constituted by a computer 16.

The computer 16 comprises: a main body 160, including a CPU 162, a memory 164 and their peripheral circuits; a display device 166, such as a CRT display; an input device 168, such as a keyboard or a mouse; a communication unit 170 for exchanging data with another node across the network 10; and a storage device 172, such as a DVD drive, a floppy disk drive or a CD-ROM drive.

In other words, the computer 16 (the watermarking unit 2, the server 12 or the detector 4) employs a general computer arrangement having a communication function.

The server 12 supplies, as needed, image data Vin, watermark data W and key data Key, or an arbitrary combination of these data, to the watermarking unit 2 via the network 10 or via a storage medium 14, such as a DVD, a CD-ROM or a floppy disk.

Figure 3:
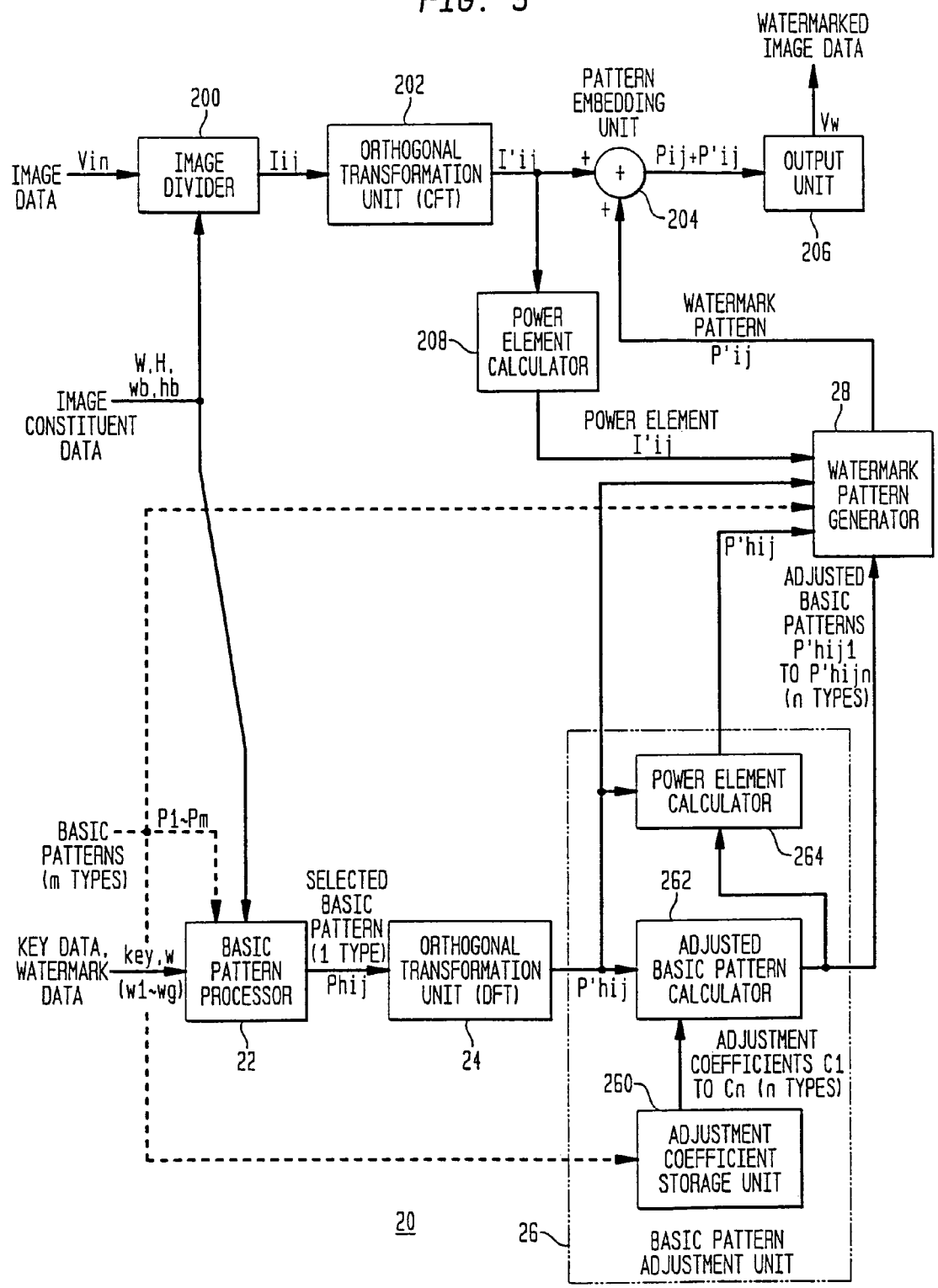
FIG. 3 is a diagram showing the structure of a watermark program that is executed by the watermarking unit in FIG. 1 in order to perform a watermark data embedding process in accordance with the present invention.

FIG. 3 is a diagram showing the arrangement of a watermarking program 20, for carrying out the watermark data embedding process of this invention, that is executed by the watermarking unit 2.

The watermarking unit 2 receives the watermarking program 20 from the server 12, via the network 10 (FIG. 1), or from the storage medium 14, via the storage device 172, and executes it. Thus, the watermarking unit 2 embeds watermark data W, which represents the copyright information, in the image data Vin that are supplied by the server 12, via the network 10, or by the storage medium 14, and obtains watermarked image data Vw (FIG. 3) in which the watermark data are embedded.

The watermarking unit 2 transmits the obtained image data Vw to the detector 4 or to the server 12 via the network 10, or stores the image data Vw on the storage medium 14 using the storage device 172 and then supplies it to the detector 4 or the server 12.

As is shown in FIG. 3, the watermarking program 20 comprises: an image divider 200, orthogonal transformation units 202 and 24, a pattern embedding unit 204, an output unit 206, a power element calculator 208, a basic pattern processor 22, a basic pattern adjustment unit 26, and a watermark pattern generator 28.

The basic pattern adjustment unit 26 is constituted by an adjusted basic pattern calculator 262, an adjustment coefficient storage unit 260 and a power element calculator 264.

Figure 4A:
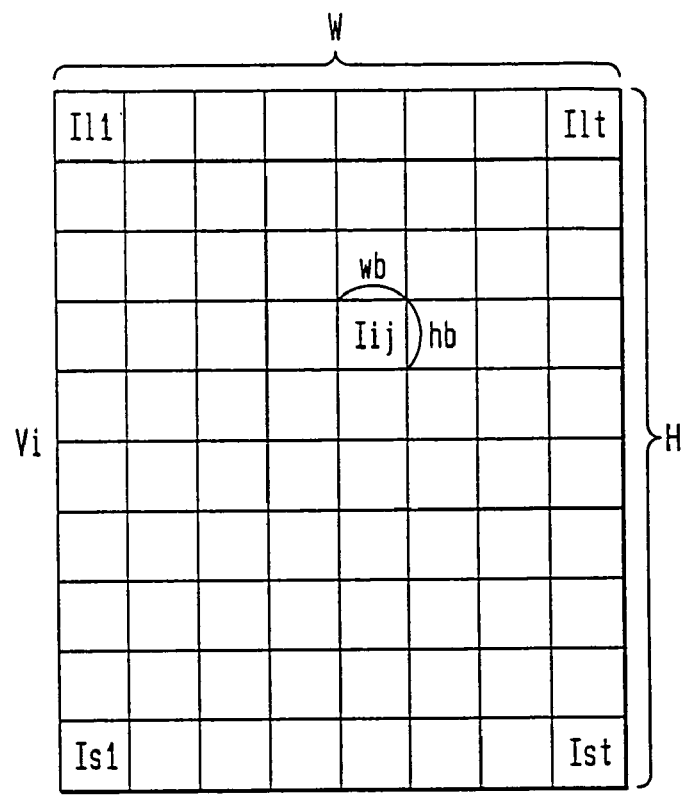
FIGS. 4A and 4B are specific diagrams showing the image division process performed by an image divider in FIG. 3, with FIG. 4A showing the image blocks Iij obtained by the image division, and FIG. 4B showing the structure of each image block Iij.
Figure 4B:
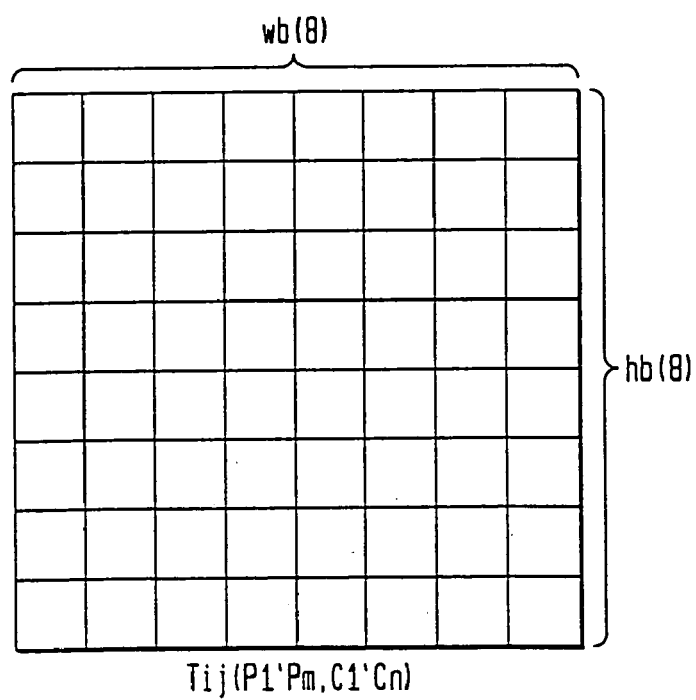

FIGS. 4A and 4B are specific diagrams showing the image division process performed by the image divider 200 in FIG. 3. In FIG. 4A, image blocks Iij are shown as the image division results, and in FIG. 4B, the structure of each image block (object image data) Iij is shown. In FIG. 4, to simplify and clarify the explanation, the number of pixels used to constitute an image is much smaller than the number that is actually required.

Based on the structure (H, W) of image data Vin (one set of image data) and the structure (hb, wb) of the image blocks Iij, which are designated and input by a user via the input device 168 (FIG. 2), as is shown in FIG. 4A, the image divider 200 (FIG. 3) divides the input image data Vin, consisting of H W pixels, into s×t image blocks I11 to Iij to Ist (s=H/hb, t≦W/wb, 1≦i≦s, 1≦j≦t), each of which is constituted by hb×wb pixels, as is shown in FIG. 4B. The obtained s×t image blocks are then output to the orthogonal transformation unit 202.

The orthogonal transformation unit 202 performs the DFT transformation shown in equation 1 for the image blocks Iij that are received from the image divider 200, and outputs the obtained DFT coefficients I'ij (also referred to, hereinafter, as image blocks I'ij) to the pattern embedding unit 204 and the power element calculator 208.

Equation 1

$$I'ij=F(Iij) \tag{1}$$

wherein F denotes a Fourier transformation.

The power element calculator 208 adds together the squared power values of the real element (Re) and the imaginary element (Im) of each of the image blocks I'ij received from the orthogonal transformation unit 202. The power element calculator 208 calculates the square root $[(Re^2+Im^2)^{1/2}]$ of the sum provided by the addition to obtain the power element I"ij of hb wb (also referred to, hereinafter, as an image block I"ij), and outputs the obtained power element to the watermark pattern generator 28.

Figures 5, 6:
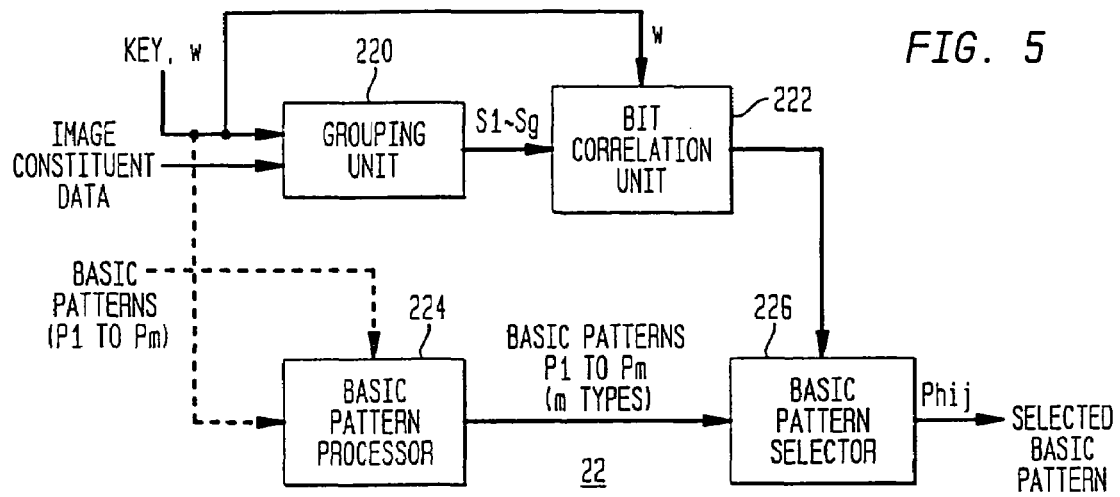
FIG. 5 is a diagram showing the structure of a basic pattern processor in FIG. 3.
FIG. 6 is a diagram showing the grouping of the image blocks Iij by a grouping unit in FIG. 5.

FIG. 5 is a diagram showing the structure of the basic pattern processor 22 in FIG. 3.

As is shown in FIG. 5, the basic pattern processor 22 comprises a grouping unit 220, a bit correspondence unit 222, a basic pattern storage unit 224, and a basic pattern selector 226.

Based on the above described image constituent data and the key data Key, which are set by a user at the input device 168 (FIG. 2) and are used to embed and detect watermark data, the basic pattern processor 22 employs these components to uniquely correspond the image blocks Iij with a bit wh (constituent data; 1≦h≦g) extracted from the g (g is an arbitrary integer) bits w1 to wg that constitute the watermark data w indicating additional information, such as copyright information for the image data Vin, and with the basic patterns Phaij and Phbij (e.g., the bit wh) that are included in the basic patterns P1 to Pm (m≧2) and that correspond to the values 0 and 1 of the bit wh.

As is shown in FIG. 4B, the basic patterns P1 to Pm have the same hb wb structure as has the image block Iij.

Actually, in accordance with the value of the bit wh that corresponds to each image block Iij, one of the basic patterns Phaij and Phbij is output by the basic pattern processor 22 as a selected basic pattern Phij that corresponds to the image block Iij.

FIG. 6 is a diagram showing the image blocks Iij grouped using the grouping unit 220 in FIG. 5. In FIG. 6, the watermark data W are constituted by 10 bits, all the image blocks Iij are included in specific groups (not all the image blocks Iij need always be included in specific groups), and the structures in FIGS. 4A and 4B are employed for the image data Vin and the image block Iij.

As is shown in FIG. 6, based on the above image constituent data, the grouping unit 220 prepares, in the image data Vin, groups S1 to Sg, each of which includes the same number of image blocks Iij that do not overlap each other and are distributed as evenly as possible. The grouping unit 220 then transmits the data representing the groups S1 to Sg to the bit correspondence unit 222.

The bit correspondence unit 222 (FIG. 5) corresponds each of the groups S1 to Sg (FIG. 6) with one of the bits w1 to wg of the watermark data w (for the easiest example, bit wh for Sh ($1 \leq h \leq g$)), and transmits the results to the basic pattern selector 226.

The basic pattern storage unit 224 stores m types (m 2) of basic patterns P1 to Pm, which are input by a user via the input device 168 or which are received from the storage device 172, and outputs them to the basic pattern selector 226.

As is shown in FIG. 4B, the basic patterns P1 to Pm are pixel patterns having different hb×wb pixel structures (Pb≠Pq (p≠q, $1 \leq p, q \leq m$)). For example, the basic patterns P1 to Pm are stored in advance in the basic pattern storage unit 224, or are generated from data held by the basic pattern storage unit 224, by using the key data Key and the watermark data W, or from data input to the basic pattern storage unit 224 by a user, via the input device 168 or the storage device 172.

When the types m of the basic patterns are reduced in accordance with the bit count g of the watermark data, while taking into account the detectability and the volume of the watermark data that is processed, the performance of the image processing system 1 is enhanced.

The basic pattern selector 226 (FIG. 5) corresponds the bit wh of the watermark data w, which was corresponded with the group sh by the bit correspondence unit 222, with the two different basic patterns Pha and Phb (Pha≠Phb) of the basic patterns P1 to Pm that are received from the basic pattern storage unit 224.

Furthermore, for example, when the value of the bit wh is 0, the basic pattern selector 226 selects the basic pattern Phaij, or in another case selects the pattern Phbij, so that the same basic pattern Ph is corresponded with all the image blocks Iij that are included in the group Sh.

As the selected basic pattern Phij that is corresponded with each of the image blocks Iij, the basic pattern selector 226 outputs correspondence results to the orthogonal transformation unit 24.

The orthogonal transformation unit 24 (FIG. 3) performs the DFT process shown in equation 2 for the selected basic pattern Phij that is input by the basic pattern processor 22, and outputs the obtained DFT coefficient P'hij (referred to, hereinafter, simply as a selected basic pattern P'hij) to the basic pattern adjustment unit 26 and the watermark pattern generator 28.

Equation 2

$$P'hij = F(Phij) \quad (2)$$

The basic pattern adjustment unit 26 adjusts the value of the elements in the selected basic pattern P'hij of each image block Iij, an generates n types of adjusted basic patterns P'hij1 to P'hijn and outputs them to the basic pattern adjustment unit 26.

In the basic pattern adjustment unit 26, the adjustment coefficient storage unit 260 stores n types of adjustment coefficients C1 to Cn, which are predetermined, which are input by a user via the input device 168 (FIG. 2), or which are generated by using the key data Key and the watermark data W. The adjustment coefficients C1 to Cn are then output to the adjusted basic pattern calculator 262.

The adjustment coefficients C1 to Cn have the same hb wb structure as has the image block Iij in FIG. 4B, and each element has a value of 0 to 1 (it should be noted that, in accordance with the application, the value need not fall within this range).

Figure 7:
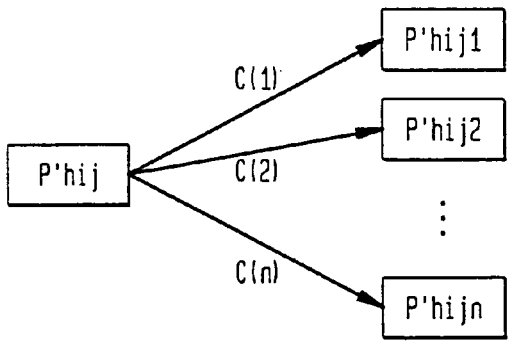
FIG. 7 is a diagram showing a method used by an adjusted basic pattern calculator in FIG. 3 to generate adjusted basic patterns P'hij1 to P'hijn.

FIG. 7 is a diagram showing a method whereby the adjusted basic pattern calculator 262 in.

FIG. 3 generates the adjusted basic patterns P'hij1 to P'hijn.

As is shown in equation 3, the adjusted basic pattern calculator 262 multiplies the same elements in the adjustment coefficients C1 to Cn and the selected basic pattern P'hij of the image block Iij that is received from the orthogonal transformation unit 24, and generates the n types of adjusted basic patterns P'hij1 to P'hijn (candidate data sets) of the hb wb structure. These n types of adjusted basic patterns P'hij1 to P'hijn are output to the watermark pattern generator 28.

Equation 3

For all the elements of Ck and P'hij, $$(P'hiju)k = (Cu)k P'hiju \quad (3)$$

where $1 \leq k \leq n$ and $1 \leq u \leq hb \times wb$; (P'hiju)k denotes the u-th element of k-th adjusted basic pattern; (Cu)k denotes the u-th element of the k-th adjustment coefficient; and P'hiju denotes the u-th element of the adjusted basic pattern.

The power element calculator 264, as well as the power element calculator 208 (FIG. 3), calculates the power elements P"hij1 to P"hijn (also referred to, hereinafter, as the adjusted basic patterns P"hij1 to P"hijn) of the adjusted basic patterns P'hij1 to P'hijn, and also calculates the power element P"hij (referred to, hereinafter, as the basic pattern P"hij) using the basic pattern P'hij that is received from the orthogonal transformation unit 24. The obtained power elements are then output to the watermark pattern generator 28.

Figure 8:
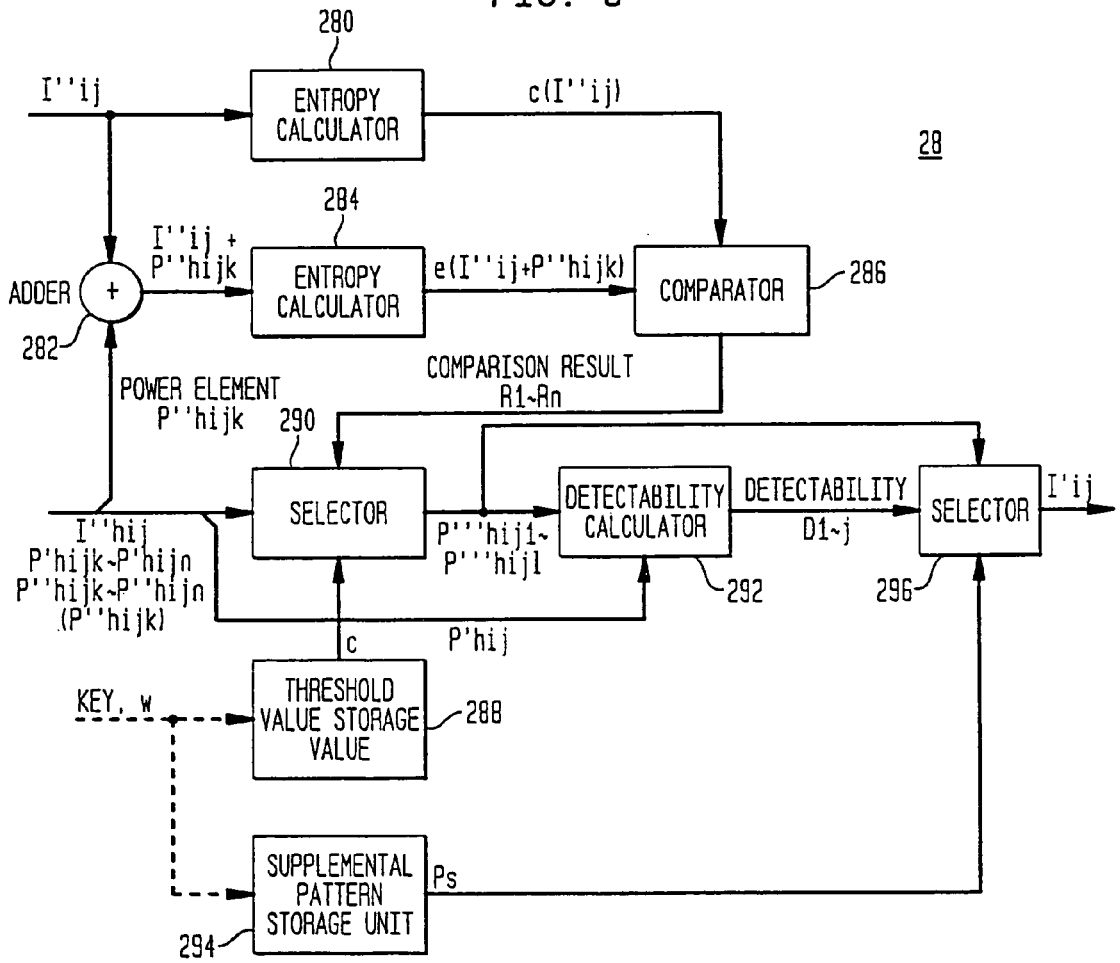
FIG. 8 is a diagram showing the arrangement of a watermark pattern generator in FIG. 3.

FIG. 8 is a diagram showing the arrangement of the watermark pattern generator 28 in FIG. 3.

As is shown in FIG. 8, the watermark pattern generator 28 comprises entropy calculators 280 and 284, an adder 282, a comparator 286, a threshold value storage unit 288, selectors 290 and 296, a detectability calculator 292, and a supplemental pattern storage unit 294.

The watermark pattern generator 28 employs these components to obtain comparison result data R1 to Rn (variation indication data) that indicate the variations (the relative indiscernibility of the adjusted basic patterns) for the image block I"ij before and after the adjusted basic patterns P"hij1 to P"hijn are added thereto.

The watermark pattern generator 28 multiplies the elements in the adjusted basic patterns P'''hij1 to P'''hijn, which are determined to have less variation (are indiscernible after being embedded), and the same element of the basic pattern P'hij that is corresponded with the image block Iij. The watermark pattern generator 28 adds the multiplication values to obtain the inner products, and obtains the detectability data sets D1 to Dn (data sets for indicating detectability) that represent the detectability of the adjusted basic patterns P'''hij1 to P'''hijn.

Furthermore, of the adjusted basic patterns P'''hij1 to P'''hijn, the watermark pattern generator 28 selects, as the adjusted basic pattern that can be detected most easily, the adjusted basic pattern that provides the highest detectability data (that is the most easily detected). Then, the watermark pattern generator 28 outputs the pattern as the final watermark pattern P'hij to the pattern embedding unit 204 in FIG. 3.

In the watermark pattern generator 28, the entropy calculator 280 calculates the entropy e(I"ij), of the power element I"ij of the image block Iij, as shown in equation 4, and outputs it to the comparator 286.

Equation 4

$$e(I''ij) = 1/\log(N) \times S(-ru \log ru) \quad (4\text{-}1)$$

$$ru = wu I''ij[u]/Swm I''ij[m] \quad (4\text{-}2)$$

where S denotes the accumulated addition value $[[(\Sigma)]]$ within a range of u=1 to N; u denotes the u-th element of Iij; N denotes the number of elements (32) included in I"ij; and wi denotes a predetermined constant.

The adder 282 adds the image block I"ij and the adjusted basic patterns P"hij1 to P"hijn, and outputs the obtained values (I"ij+P"hij1) to (I"ij+P"hijn) to the entropy calculator 284.

The entropy calculator 284, as well as the entropy calculator 280, calculates the entropy for e(I"ij+P"hij1) to e(I"ij+P"hijn) for the addition values (I"ij+P"hij1) to (I"ij+P"hijn) that are received from the adder 282, and outputs the entropy to the comparator 286.

The comparator 286 calculates absolute values |e(I"ij)+e(I"ij+P"hij1)| to |e(I"ij)−e(I"ij+P"hijn)| for the differences between the entropy (I"ij) for the image block I"ij and the entropy for [e(I"ij+P"hij1) to e(I"ij+P"hijn)] of the addition values (I"ij+P"hij1) to (I"ij+P"hijn), which are received from the entropy calculator 280. The comparator 286 obtains the resultant comparison data sets R1 to Rn, which indicate the variations (the relative indiscernibility of the adjusted basic patterns) for an image before and after the watermark data are embedded therein by adding. The data sets R1 to Rn are then output to the selector 290.

The threshold value storage unit 288 stores a threshold value e (0≦e) that is obtained, for example, through an experiment conducted in advance, is set by a user via the input device 168 or the storage device 172 (FIG. 2), or is a threshold value e that is calculated by using the key data Key and the watermark data w. Thereafter, the threshold value e is output to the selector 290.

The threshold value e is so set that when the value of the comparison data Rk (1≦k≦n) is smaller than the threshold value e, even when the adjusted basic pattern P'hijk that is corresponded with the data Rk is added to the image block I'ij and reverse transformation is performed for the resultant image block I'ij, a normal person can not or can only faintly perceive the displayed pattern, and so that when the value of the comparison data Rk (1≦k≦n) is equal to or greater than that of the threshold value e, a normal person can perceive the adjusted pattern P'hijk that is added to the image block I'ij.

Figure 9:
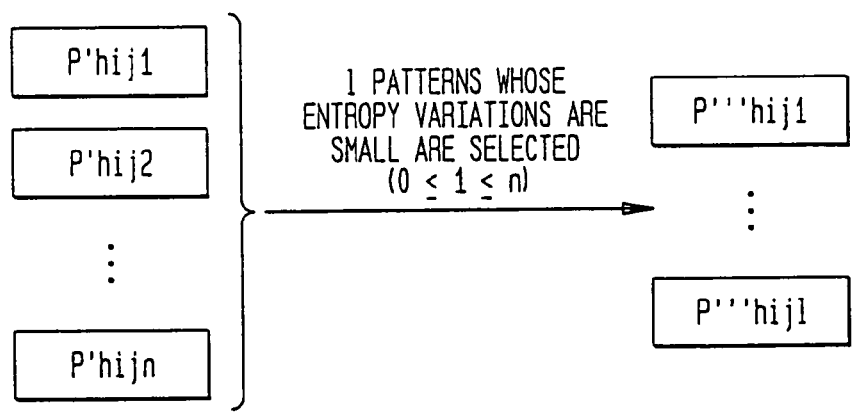
FIG. 9 is a diagram showing a method whereby a selector in FIG. 8 selects, from adjusted basic patterns P'hij1 to P'hijn, the "1" adjusted basic patterns P'''hij1n to P'''hi1 that evidence little variation, even when added to the image block Iij.

FIG. 9 is a diagram showing a method whereby the selector 290 in FIG. 8 selects one of the adjusted basic patterns P'''hij1 to P'''hij1 that has only slight variations, even when the adjusted basic patterns P'hij1 to P'hijn are added to the image block Iij. It should be noted that 0≦1≦n, and that when 1=0 there are no variation indication data that are equal to or smaller than the threshold value e.

The selector 290 compares the threshold value e received from the threshold value storage unit 288 with the absolute values |e(I"ij)−e(I"ij+P"hij1)| to |e(I"ij)−e(I"ij+P"hijn)| of the differences that are received from the comparator 286. The selector 290 then selects the adjusted basic patterns P'''hij1 to P'''hij1 that provides the absolute value |e(I"ij)−e(I"ij+P"hijk)|(1≦k≦n) less than or equal to the threshold value e, i.e., the absolute value |e(I"ij)−e(I"ij+P"hijk)| that satisfies equation 5. The selected adjusted basic pattern is thereafter output to the detectability calculator 292 and the selector 296.

Equation 5

$$|e(I''ij) - e(I''ij + P''hijk)| e \quad (5)$$

When there are adjusted basic patterns P'''hij1 to P'''hij1 received from the selector 290, as is shown in equation 6, the detectability calculator 292 multiplies the same elements in the adjusted basic patterns P'''hij1 to P'''hij1 and in the basic pattern P'hij, and adds the results to obtain the product sum (inner product).

Equation 6

$$Dk = (P'''hijk)(P'hij) \quad (6)$$

$$= S(P'''hijk)[u]P'hij[u]$$

where 1≦k≦1; S denotes the accumulated addition values (Σ) within a range of 1 to N; (P'''hijk)u denotes the u-th element of P'''hijk; and P'hiju denotes the u-th element of P'hij.

Furthermore, the detectability calculator 292 outputs to the selector 296, as the detectability data sets D1 to D1 that represent the detectability of the adjusted basic patterns P'''hij1 to P'''hij1, the inner products obtained using equation 6.

When the adjusted basic patterns P'''hij1 to P'''hij1 input by the selector 290 are not present, the detectability calculator 292 transmits a notification to that effect to the selector 296.

When the detectability calculator 292 notifies the selector 296 that the adjusted basic patterns P'''hij1 to P'''hijn input by the selector 290 are not present, the supplemental pattern storage unit 294 receives a supplemental pattern Ps, which is output as the final watermark pattern P'ij, from the input device 168 or the storage device 172 as a result of an operation performed by a user, or generates and stores the supplemental pattern Ps using the key data Key and the watermark data W. The supplemental pattern Ps is then output to the selector 296.

Upon the receipt of the detectability data D1 to Dn from the detectability calculator 292, the selector 296 selects one of the adjusted basic patterns P'''hij1 to P'''hijn that is received from the selector 290 and that corresponds to the detectability data for the maximum value, and outputs the selected basic pattern as a watermark pattern P'ij to the pattern embedding unit 204 (FIG. 3). In another case, the selector 296 outputs the supplemental pattern Ps received from the supplemental pattern storage unit 294 to the pattern embedding unit 204 (FIG. 3) as the watermark pattern P'ij.

The pattern embedding unit 204 (FIG. 3) embeds the watermark pattern by adding together the same elements in each image block I'ij, received from the orthogonal transformation unit 202, and in the watermark pattern P'ij, received from the watermark pattern generator 28. The obtained image block (I'ij+P'ij) is thereafter output to the output unit 206.

The output unit 206 performs run-length coding, for example, for the image block (I'ij+P'ij) received from the pattern embedding unit 204, and forms the obtained data into a predetermined transmission format for generating embedded picture data Vw. The output unit 206 then transmits the picture data Vw to the detector 4 via the network 10, or distributes the picture data Vw to the detector 4 via the storage device 172 and the storage medium 14.

Figure 10:
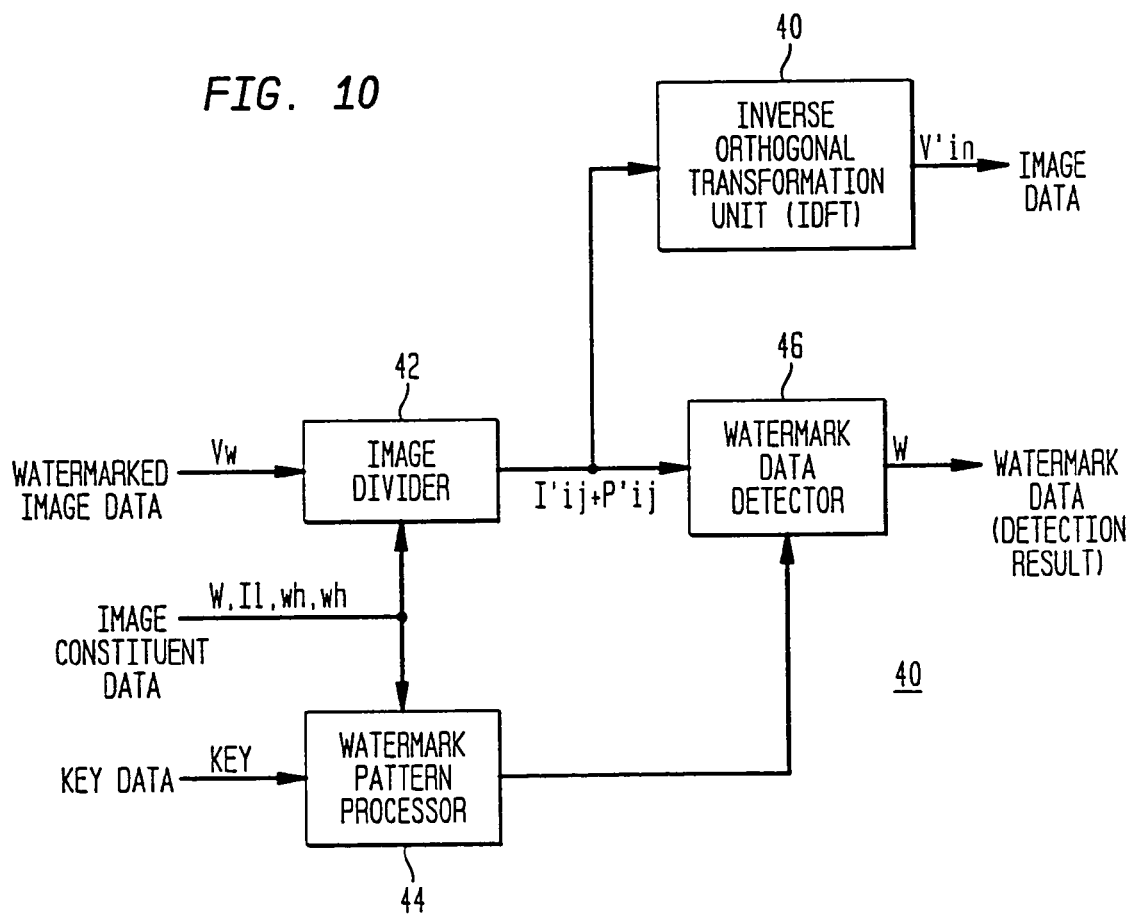
FIG. 10 is a diagram showing the structure of a detection program that is executed by the detector in FIG. 1 to perform a watermark data detection process according to the present invention.

FIG. 10 is a diagram showing the arrangement of a detection program 40, which is executed by the detector 4 in FIG. 1, for carrying out the watermark data detection process according to the present invention.

The detector 4 executes the watermark data detection program 40 that is supplied to the storage device 172 via the storage medium 14, or that is supplied by the server 12 via the network 10, and implements the watermark data detection process in accordance with the present invention.

As is shown in FIG. 10, the watermark data detection program 40 comprises an image divider 42, a watermark pattern processor 44, an inverse orthogonal transformation unit 48, and a watermark data detector 46.

The watermark data detection program 40 employs these components to detect the watermark data W held by the picture data Vw, in which the watermark data W are embedded by the watermarking unit 2 (the watermarking process program 20).

The image divider 42 performs the inverted process for the output unit 206 of the watermarking program 20 (FIG. 3), i.e., the run-length decoding and the division process in FIG. 4A, for the image data Vw that are supplied by the watermarking unit 2 (watermarking program 20 in FIG. 3) via the network 10 or the storage medium 14. Thus, the image divider 42 obtains the image block I'ij+P'ij in which the watermark pattern is embedded (referred to, hereinafter, simply as the image block I'ij+P'ij) and outputs it to the inverse orthogonal transformation unit 48 and the watermark data detector 46.

The inverse orthogonal transformation unit 48 performs the inverse DFT (IDFT) process for the image block I'ij+P'ij received from the image divider 42, and generates and stores image data Vin' in the storage device 172 (FIG. 2), or displays it on the display device 166.

The watermark pattern processor 44 employs key data Key, which is set by the user using the input device 168 (FIG. 2), as well as the basic pattern processor 22 in the watermarking program 20 (FIG. 3), and corresponds the image block I'ij+P'ij with the basic patterns Phaij and Phbij.

Based on the correlation of the image block I'ij+P'ij and the basic patterns Phaij and Phbij, the watermark data detector 46 detects the value of the bit wh of the watermark data W that is embedded in the image block I'ij+P'ij.

Since the same bit is embedded in a plurality of image blocks of the watermarked image data Vw, the same bit wh is detected in a plurality of image blocks, and a bit value obtained by a decision of the majority is regarded as the final bit wh, so that the reliability of the detected image data W is increased.

The overall operation of the image processing system 1 (FIG. 1) will now be described.

Figure 11:
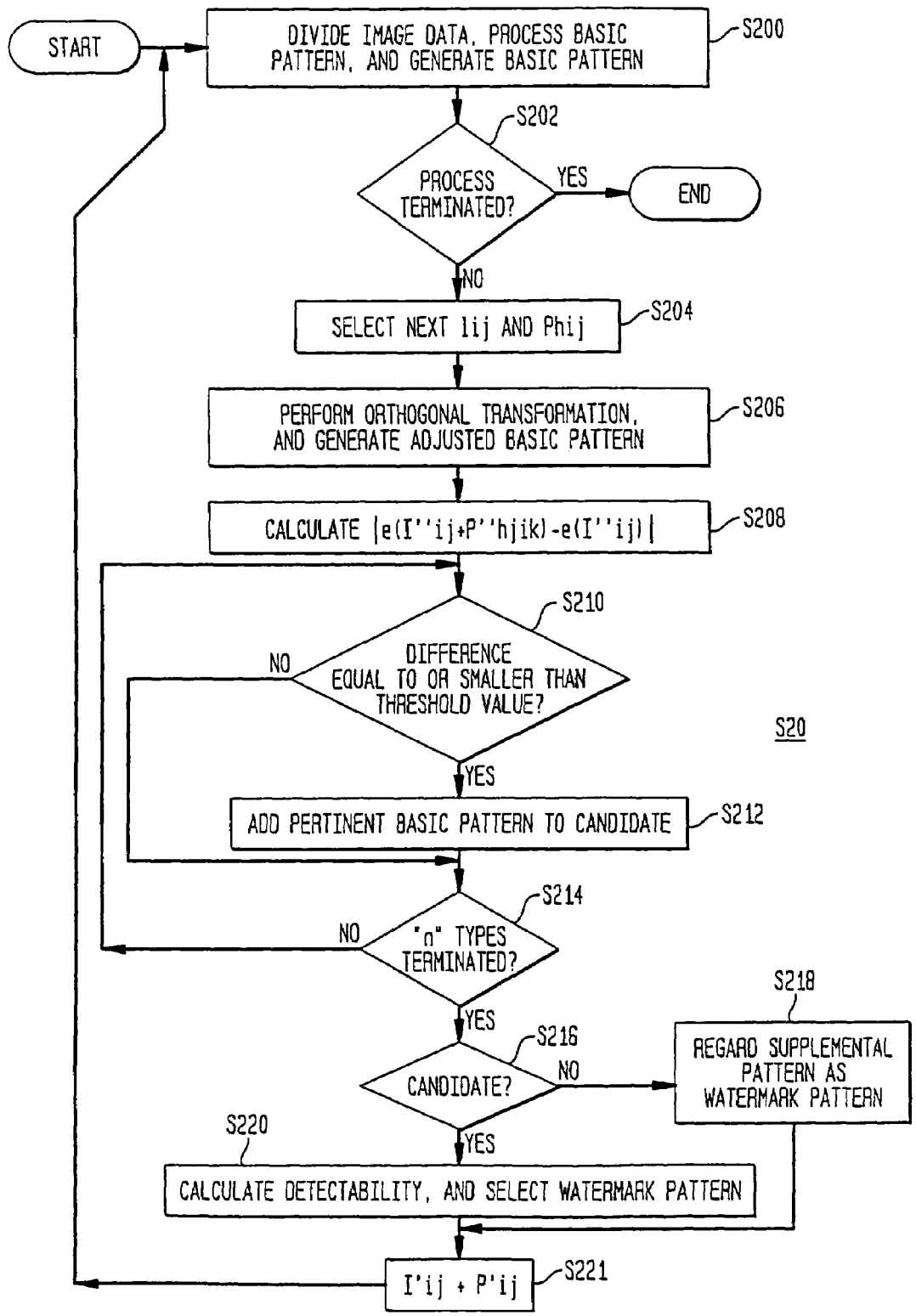
FIG. 11 is a flowchart (S20) showing the processing performed for the watermark program in FIG. 3.

FIG. 11 is a flowchart showing, for example, the processing (S20) of the watermarking program 20 in FIG. 3.

Figure 12:
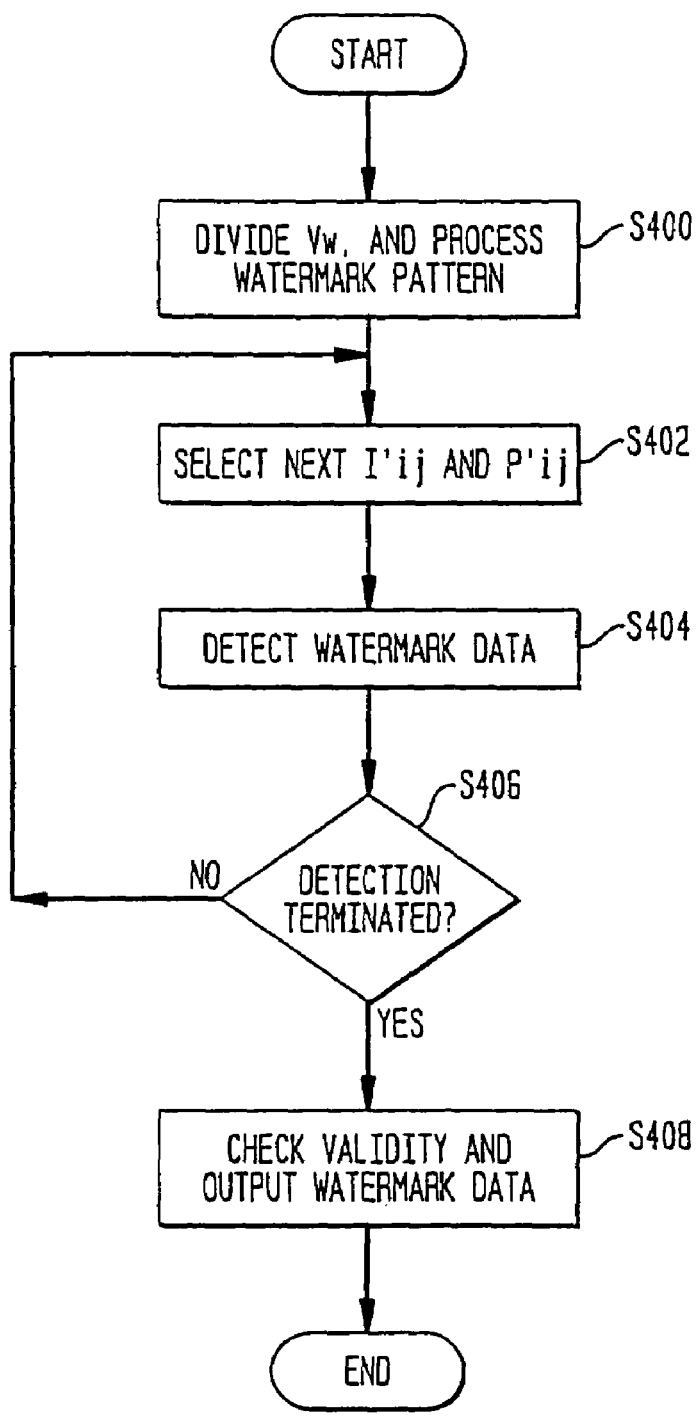
FIG. 12 is a flowchart (S40) showing the processing performed for the watermark data detection program in FIG. 10.

FIG. 12 is a flowchart showing the processing (S40) of the watermark data detection program 40 in FIG. 10.

First, the operation of the watermarking unit 2 will be described while referring to FIG. 11.

When the watermarking unit 2 (FIG. 1) activates the watermarking program 20 (FIG. 3), at step 200 (S200) the image divider 200 divides the image data Vin as is shown in FIGS. 4A and 4B, and generates the image blocks Iij.

The basic pattern processor 22 corresponds each of the image blocks Iij with the selected basic pattern Phij, as was explained, for example, while referring to FIG. 6.

The basic pattern storage unit 224 of the basic pattern processor 22 generates and stores, as needed, the basic patterns P1 to Pm.

The threshold value storage unit 288, of the watermark pattern generator 28, generates and stores the threshold value e as needed.

The supplemental pattern storage unit 294 of the watermark pattern generator 28, a needed, generates and stores the supplemental pattern Ps.

At step 202 (S202), the watermarking program 20 (output unit 206) determines whether the embedding process has been terminated for all the image blocks Iij. When the process has been terminated, the output unit 206 generates the watermarked image data Vw, from the image block I'ij+P'ij, in which the watermark pattern is embedded, and distributes the image data Vw to the network 10 and the server 12.

At step 204 (S204), the orthogonal transformation units 202 and 24 select the next image block Iij to be processed and the selected basic pattern Phij.

At step 206 (S206), the orthogonal transformation units 202 and 24 perform DFT transformation for the image block Iij and the selected basic pattern Phij that are selected at step 204, and generates the image block I'ij and the selected basic pattern P'ij and the power element calculators 208 and 264 generate their power elements I"ij. Then, the basic pattern adjustment unit 26 generates the adjusted basic patterns P'hij1 to P'hijn, as was explained while referring to FIG. 7.

At step 208 (S208), the entropy calculator 280, the adder 282, the entropy calculator 284 and the comparator 286 (FIG. 8), of the watermark pattern generator 28 (FIG. 3), respectively calculate the absolute values (R1 to Rn) of the differences between the entropy values for the image block I"ij and the individual values obtained by adding the image block I"ij and the adjusted basic patterns P'hij1 to P'hijn.

At step 210 (S210), the selector 290 (FIG. 8) extracts the difference (comparison data Rk) between the entropy of the image block I"ij, to be compared next, and the entropy of the I"ij+P"hijk (1≦k≦n), and determines whether the value of the data Rk is equal to or smaller than the threshold value e that is received from the threshold value storage unit 288. When the value of the data Rk is equal to or smaller than the threshold value e, program control advances to step 212, and when the value of the data Rk is greater than the threshold value e, program control is shifted to step 214.

At step 212 (S212), the selector 290 adds the adjusted pattern P'hijk, which corresponds to the data Rk, to the process targets (candidate: adjusted basic patterns P'''hij1 to P'''hijn) of the detectability calculator 292 and the selector 296.

At step 214 (S214), the selector 290 determines whether all the n types of adjusted basic patterns P'hij1 to P'hijn have been processed. When the process has been completed, program control advances to step 216. But when the process has not been completed, program control returns to step 210.

At step 216 (S216), the detectability calculator 292 determines whether the adjusted basic patterns P'''hij1 to P'''hijn (candidates) to be processed have been received from the selector 290. When the adjusted basic patterns P'''hij1 to P'''hijn have been received, program control advances to step 220. But when these basic patterns have not yet been received, program control shifts to step 218.

At step 218 (S218), the detectability calculator 292 notifies the selector 296 that there is no processing target, and upon the receipt of this notification, the selector 296 outputs, as the watermark pattern P'ij, the supplemental pattern Ps input by the supplemental pattern storage unit 294.

At step 220 (S220), the detectability calculator 292 calculates, as detectability data sets D1 to Dn, the inner products of the selected basic pattern P'hij and the individual adjusted basic patterns P'''hij1 to P'''hijn that are received from the selector 290. The selector 296 outputs, as the watermark pattern P'ij, one of the adjusted basic patterns P'''hij1 to P'''hijn that of the detectability data D1 to Dn provides the maximum value.

At step 222 (S222), the pattern embedding unit 204 (FIG. 3) adds and embeds the watermark pattern P'ij, which is received from the selector 296 (FIG. 8) of the watermark pattern generator 28, to the image block I'ij that is received from the orthogonal transformation unit 202. Program control then returns to step 202.

As is shown in FIG. 12, when the detector 4 (FIG. 1) activates the watermark data detection program 40 (FIG. 10), at step 400 (S400) the image divider 42 divides the watermarked image data Vw that is supplied by the watermarking unit 2, via the network 10 and the server 12 or via the storage medium 14, and obtains the image blocks I'ij+P'ij. The watermark pattern processor 44 then employs the key data Key to correspond the image block I'ij+P'ij with the basic patterns Phaij and Phbij.

In accordance with a user's manipulation of the input device 168 (FIG. 2), the inverse orthogonal transformation unit 48 performs the IDFT transformation for the image block I'ij+P'ij, and displays the result on the display device 166.

At step 402 (S402), the watermark data detector 46 selects the image block I'ij+P'ij that is to be processed next.

At step 404 (S404), the watermark data detector 46 obtains the correlation of the image block I'ij+P'ij with the basic patterns Phaij and Phbij, and employs the correlation to determine the value of the bit wh of the watermark data W that is embedded in the basic patterns Phaij and Phbij.

At step 406 (S406), the watermark data detector 46 determines whether the detection process has been completed for all the image blocks I'ij+P'ij. When the detection process has been completed, program control advances to step S408. But when the detection process has not been uncompleted, program control returns to step 402.

At step 408 (S408), the watermark data detector 46 examines the validity of the majority of the individual bits wh of the detected watermark data W. The watermark data detector 46 then combines the detected bits wh and outputs them as the watermark data W.

As is described above, the data processing apparatus and the method therefor of the present invention are provided to resolve the conventional shortcomings. According to the invention, watermark data that indicate additional information, such as copyright information, can be optimized in accordance with the contents of object data, and the optimized watermark data can be embedded.

Furthermore, according to the image processing apparatus of the invention and the method therefor, watermark data can be optimized in accordance with the quality of image data, such as the property of an object, so that watermark data that is less noticeable and is easily detectable can always be employed to perform embedding.

While the invention has been particularly shown and described with respect to preferred embodiments thereof, it will be understood by those skilled in the art that the foregoing and other changes in form and details may be made therein without departing form the spirit and scope of the invention.

The invention claimed is:

1. A data processing apparatus for selecting one of a plurality of candidate data corresponding to watermark data embedded into object data to embed the selected one candidate data as said watermark data, comprising:

object processing apparatus for dividing input data into a plurality of object blocks distributed in a spatial domain, each object block comprising an array of pixels, and using the object blocks as said object data for embedding;

a variation indication data generation means for generating a plurality of variation indication data indicating variation between said object data and each of the object data obtained by embedding each of said plurality of candidate data, each of said plurality of candidate data comprised of a different block pattern having pixel element values adjusted from a selected basic pattern associated with an individual object block and having a same structure as said object block;

a detectability indication data generation means for generating a plurality of detectability indication data, each indicating the detectability of each of said plurality of candidate data;

a watermark data selection means for selecting one of said candidate data based on said plurality of variation indication data and said plurality of detectability indication data; and a data embedding means for embedding the selected candidate data into said object data as said watermark data, wherein said embedding is performed in said spatial domain.

2. An image processing apparatus for selecting one of a plurality of candidate data corresponding to watermark data embedded into image data to embed the selected candidate data into said image data as said watermark data, comprising:

image processing apparatus for dividing input data into a plurality of object blocks, each object block spatially distributed throughout an image and comprising an array of pixels, and using the object blocks as said image data for embedding;

a variation indication data generation means for generating a plurality of variation indication data indicating variation between said image data and each of the image data obtained by embedding each of said plurality of candidate data, each of said plurality of candidate data comprised of a different block pattern having pixel element values adjusted from a selected basic pattern associated with an individual object block and having a same structure as said object block;

a detectability indication data generation means for generating detectability indication data, each indicating the detectability of each of zero or more candidate data;

a candidate data selection means, for employing said detectability indication data to select one of said candidate data that corresponds to variation indication data for variations that are smaller than a predetermined reference; and a data embedding means for embedding the selected candidate data as said watermark data in said image data, wherein said embedding is performed in a spatial domain.

3. The image processing apparatus according to claim 2, wherein said detectability indication data generation means generates detectability indication data indicating the detectability of said candidate data corresponding to said variation indication data indicating variations smaller than said predetermined reference.

4. The image processing apparatus according to claim 2, wherein, when no candidate data corresponding to said variation indication data for variations smaller than said predetermined reference exists, said candidate data selection means selects predetermined supplement data, instead of said candidate data.

5. The image processing apparatus according to claim 2, wherein each of said object image data is each of a plurality of image blocks obtained by dividing one image data set, and wherein each of said watermark data corresponding to each of said object image data includes one or more types of constituent data constituting additional information that is added to said object image data, said image processing apparatus further comprising:

a watermark data correspondence means for corresponding said constituent data constituting said additional information data with said plurality of image blocks, as said watermark data; and a candidate data generation means for generating said plurality of candidate data corresponding to said constituent data corresponding with said plurality of image blocks.

6. The image processing apparatus according to claim 5, wherein said watermark data correspondence means accepts predetermined key data to correspond said constituent data of said additional information data with said plurality of image blocks based on said predetermined key data.

7. The image processing apparatus according to claim 5, wherein said candidate data generation means generates, as said plurality of candidate data, a plurality of additional patterns employing the same configuration as said object image data to be added to said object image data.

8. The image processing apparatus according to claim 7, wherein said candidate data generation means generates said plurality of additional patterns by multiplying a plurality of predetermined coefficients with basic patterns corresponding to said constituent data of said image blocks.

9. The image processing apparatus according to claim 8, wherein said detectability indication data generation means calculates said detectability indication data representing a correlation between said additional patterns and said basic patterns; and wherein said candidate data selection means selects, from among said additional patterns, a pattern corresponding to detectability indication data representing the highest correlation, said image processing apparatus further comprising:

a watermark data detection means for detecting said watermark data embedded into said image block, based on said correlation of said basic patterns and an image block into which the selected additional pattern is embedded.

10. The image processing apparatus according to claim 5, wherein said watermark data correspondence means sorts said plurality of image blocks into one or more groups, each of which including one or more of said image blocks to correspond said constituent data with said image blocks that are included in said groups.

11. The image processing apparatus according to claim 2, wherein said variation indication data generation means calculates each differences between each entropy values for said object image data and each entropy values for said object image data obtained by embedding each of said plurality of candidate data as said variation indication data.

12. The image processing apparatus according to claim 2, wherein said detectability indication data generation means generates said detectability indication data for said respective candidate data corresponding to said variation indication data with their values within a predetermined range.

13. A data processing method for selecting one of a plurality of candidate data corresponding to watermark data embedded into object data for embedding the selected candidate data as said watermark data, comprising:

object processing including dividing input data into a plurality of object blocks distributed in a spatial domain, each object block comprising an array of pixels, and using the object blocks as said object data for embedding;

a variation indication data generation step of generating a plurality of variation indication data indicating variation between said object data and each of the object data obtained by embedding each of said plurality of candidate data, each of said plurality of candidate data comprised of a different block pattern having pixel element values adjusted from a selected basic pattern associated with an individual object block and having a same structure as said object block;

a detectability indication data generation step of generating a plurality of detectability indication data, each indicating the detectability of each of said plurality of candidate data;

a watermark data selection step of selecting one of said candidate data based on said plurality of variation indication data and said plurality of detectability indication data; and a data embedding step of embedding the selected candidate data into said object data as said watermark data, wherein said embedding is performed in said spatial domain.

14. An image processing method for selecting one of a plurality of candidate data corresponding to watermark data embedded into image data for embedding the selected candidate data into said image data as said watermark data, comprising:

image processing including dividing input image data into a plurality of image blocks, each image block spatially distributed throughout an image and comprising an array of pixels, and using the image blocks as said image data for embedding;

a variation indication data generation step of generating a plurality of variation indication data indicating variation between said image data and each of the image data obtained by embedding each of said plurality of candidate data, each of said plurality of candidate data comprised of a different block pattern having pixel element values adjusted from a selected basic pattern associated with an individual object block and having a same structure as said object block;

a detectability indication data generation step of generating detectability indication data, each indicating the detectability of each of zero or more candidate data;

a candidate data selection step of employing said detectability indication data to select one of said candidate data that corresponds to variation indication data for variations that are smaller than a predetermined reference; and a data embedding step of embedding the selected candidate data as said watermark data in said image data, wherein said embedding is performed in a spatial domain.

15. A program storage device readable by a machine, tangibly embodying a program of instructions executable by the machine to perform the method steps for selecting one of a plurality of candidate data corresponding to watermark data embedded into object data to embed the selected candidate data as said watermark data, said method steps comprising:

object processing including dividing input data into a plurality of object blocks distributed in a spatial domain, each object block comprising an array of pixels, and using the object blocks as said object data for embedding;

a variation indication data generation step of generating a plurality of variation indication data indicating variation between said object data and each of the object data obtained by embedding each of said plurality of candidate data, each of said plurality of candidate data comprised of a different block pattern having pixel element values adjusted from a selected basic pattern associated with an individual object block and having a same structure as said object block;

a detectability indication data generation step of generating a plurality of detectability indication data, each indicating the detectability of each of said plurality of candidate data;

a watermark data selection step of selecting one of said candidate data based on said plurality of variation indication data and said plurality of detectability indication data; and a data embedding step of embedding the selected candidate data into said object data as said watermark data, wherein said embedding is performed in said spatial domain.

16. A program storage device readable by a machine, tangibly embodying a program of instructions executable by the machine to perform the method steps for selecting one of a plurality of candidate data corresponding to watermark data embedded into image data to embed the selected candidate data as said watermark data, said method steps comprising:

image processing including dividing input image data into a plurality of image blocks, each image block spatially distributed throughout an image and comprising an array of pixels, and using the image blocks as said image data for embedding;

a variation indication data generation step of generating a plurality of variation indication data indicating variation between said image data and each of the image data obtained by embedding each of said plurality of candidate data, each of said plurality of candidate data comprised of a different block pattern having pixel element values adjusted from a selected basic pattern associated with an individual object block and having a same structure as said object block;

a detectability indication data generation step of generating detectability indication data, each indicating the detectability of each of zero or more candidate data;

a candidate data selection step of employing said detectability indication data to select one of said candidate data that corresponds to variation indication data for variations that are smaller than a predetermined reference; and a data embedding step of embedding the selected candidate data as said watermark data in said image data, wherein said embedding is performed in a spatial domain.

17. The program storage device according to claim 16, wherein said detectability indication data generation step generating detectability indication data that indicate the detectability of said candidate data corresponding to said variation indication data indicating variations smaller than said predetermined reference.

18. The program storage device according to claim 16, wherein, when no candidate data corresponding to said variation indication data for variations smaller than said predetermined reference exists, instead of said candidate data, said candidate data selection step selects predetermined supplement data.

19. The program storage device according to claim 16, wherein each of said object image data includes a plurality of image blocks obtained by dividing one image data set;

wherein each of said watermark data corresponding to each of said object image data includes one or more types of constituent data constituting additional information that is added to said object image data; and wherein said computer-readable program further comprises a watermark data correspondence step of corresponding said constituent data constituting said additional information data with said plurality of image blocks, as said watermark data, and a candidate data generation step of generating said plurality of candidate data corresponding to said constituent data corresponding with said plurality of image blocks.

20. The program storage device according to claim 19, wherein said watermark data correspondence step includes accepting predetermined key data to correspond said constituent data of said additional information data with said plurality of image blocks based on said predetermined key data.

21. The program storage device according to claim 19, wherein said candidate data generation step generates a plurality of additional patterns employing the same configuration as said object image data to be added to said object image data as said plurality of candidate data.

22. The program storage device according to claim 21, wherein said detectability indication data generation step calculates said detectability indication data representing a correlation between said additional patterns and said basic patterns;

wherein said candidate data selection step selects a pattern corresponding to detectability indication data representing the highest correlation among said additional patterns; and wherein said computer-readable program further comprises a watermark data detection step of detecting said watermark data embedded into said image block, said correlation of said basic patterns and an image block into which the selected additional pattern is embedded.

23. The program storage device according to claim 22 wherein said detectability indication data generation step calculates the products of said additional patterns, and corresponding data that are included in said basic patterns, that correspond to said additional pattern are calculated as said detectability indication data; and wherein said candidate data selection step selects said candidate data that correspond to the detectability indication data of a maximum value.

24. The program storage device according to claim 19, wherein said watermark data correspondence step sorts said plurality of image blocks into one or more groups, each of which including one or more of said image blocks to correspond said constituent data are corresponded with said image blocks that are included in said groups.

25. The program storage device according to claim 16, wherein said variation indication data generation step calculates each of differences between each of entropy values for said object image data and each of entropy values for said object image data obtained by embedding each of said plurality of candidate data as said variation indication data.

26. The program storage device according to claim 16, wherein said detectability indication data generation step generates said detectability indication data for said respective candidate data corresponding to said variation indication data with their values within a predetermined range.

* * * * *